United States Patent [19]
Manske

[11] 3,955,115
[45] May 4, 1976

[54] COLOR TELEVISION WITH VRT AND AUTOMATIC DEGAUSSING

[75] Inventor: Hans E. Manske, Addison, Ill.

[73] Assignee: Zenith Radio Corporation, Chicago, Ill.

[22] Filed: Jan. 3, 1975

[21] Appl. No.: 538,633

[52] U.S. Cl. .......................... 315/8; 317/157.5 TV
[51] Int. Cl.² ..................... H01J 29/06; H01J 31/20
[58] Field of Search ........................................ 315/8

[56] References Cited
UNITED STATES PATENTS

| | | | |
|---|---|---|---|
| 3,249,795 | 5/1966 | Dietch | 315/8 |
| 3,798,493 | 3/1974 | Manske | 315/8 |
| 3,798,497 | 3/1974 | Manske | 315/29 |

Primary Examiner—Robert Segal
Attorney, Agent, or Firm—Nicholas A. Camasto

[57] ABSTRACT

A color television receiver includes a voltage regulating transformer having an additional secondary winding coupled to the primary side of the transformer through a thermistor. A degaussing coil is supplied through another thermistor from the main secondary winding. Upon turn-on of the receiver, the additional secondary winding enables substantially higher current flow through the degaussing coil to assist in demagnetization of the permeable material in the picture tube.

6 Claims, 2 Drawing Figures

COLOR TELEVISION WITH VRT AND AUTOMATIC DEGAUSSING

BACKGROUND OF THE INVENTION

This invention relates to color television receivers and in particular to color television receivers including voltage regulating transformers.

A number of recent color television receivers have included regulating circuitry or apparatus to control the secondary voltages produced in the receiver in response to line and load voltage changes. Such receivers can operate satisfactorily under a wide variety of input line voltage conditions. Aside from the considerable advantage of satisfactory operation under very low line voltages (brown-out conditions), there are very attractive advantages in extended receiver component life as well as reduced possibility of x-radiation and protection in the event of temporary voltage surges due to line switching, lightning and the like. With the widespread use of solid state devices in television receivers, the latter advantage is of extreme importance.

An example of one widely accepted type of system employing a voltage regulating transformer (VRT) may be found in U.S. Pat. No. 3,798,497 which is directed to the combination of such a regulating transformer in conjunction with a solid state receiver chassis. The arrangement described obtains the abovementioned advantages of immunity from line voltage surges, satisfactory low-line voltage operability, x-radiation protection and overall receiver component life improvement.

Most modern color television receivers also include some means for degaussing or removing any residual magnetization of the permeable material within or surrounding the color picture tube. As is well known, the three electron beams in a conventional tri-color television picture tube are oriented with respect to the colored-light-emitting phosphor deposits on the viewing screen such that each beam strikes only its associated phosphor deposits. The color selection is accomplished in conjunction with a magnetically susceptible aperture mask which is mounted closely adjacent the viewing screen in the paths of the electron beams. Any magnetic field, including the earth's magnetic field, may magnetize the mask or other associated magnetizable material and adversely influence the paths of the electron beams, resulting in color impurity (i.e., an electron beam straying onto the wrong phosphor deposits). In most receivers, the picture tube area is subjected to a degaussing field each time the receiver is turned on from a "cold" start.

There are a variety of circuits in use for performing this function, a common one involving passage of alternating current through a degaussing winding situated close to the color tube funnel near the viewing end and supplied an alternating current through a thermistor device. With current flow, the thermistor temperature rises, increasing its resistance and tapering the current to a very low value. As is well known, the tapered alternating current through the degaussing winding cycles the permeable material associated with the picture tube through progressively smaller hysteresis "loops" for demagnetization. The maximum current amplitude is the determining factor in the degree of degaussing which can be accomplished. With constant voltage regulating transformers, the amount of current available is restricted because of the regulating action. Recently issued U.S. Pat. No. 3,798,493 is directed to degaussing in a voltage regulating transformer type television receiver having an instant-play feature. In such receivers the secondary current available for degaussing purposes is not only limited by the voltage regulating action but by the effect on the degaussing thermistor temperature of the "normal" standby operating current. The patented circuit includes a separate degaussing coil directly supplied from the primary of the transformer. The disadvantage of such a system is that the degaussing coils are connected to the primary or "hot" side of the transformer.

Isolation of the degaussing coils may be obtained by supplying the degaussing current from the transformer secondary. In a non-instant-play receiver, this may be accomplished by appropriate selection of transformer size, degaussing winding turns and resistance and thermistor characteristics. To achieve adequate degaussing, it is incumbent to maintain very low degaussing circuit resistance and a large number of turns in the degaussing coils, both of which entail economic disadvantages.

SUMMARY OF THE INVENTION

In accordance with the invention, an auxiliary winding is coupled to the secondary side of the voltage regulating transformer through a winding which bypasses the shunt portion of the core, thus enabling supply of increased secondary current. The additional secondary winding is coupled through another thermistor which is disabled after a predetermined time for de-energizing the additional winding. Accordingly, for a short time interval the degaussing coil is supplied with a substantially larger degaussing current than would be the case where the additional secondary winding is not utilized. As a result, adequate degaussing may be obtained without requiring a low impedance degaussing circuit or large number of coil turns while also maintaining isolation of the degaussing coils.

OBJECTS OF THE INVENTION

An object of this invention is to provide an improved color television receiver.

A further object of this invention is to provide an improved degaussing system for a color television receiver having a constant voltage regulating transformer.

BRIEF DESCRIPTION OF THE DRAWINGS

These and other objects of the invention will become apparent upon reading the following description of the preferred embodiments of the invention in conjunction with the drawing in which.

DESCRIPTION OF THE PREFERRED EMBODIMENTS

Figure 1:
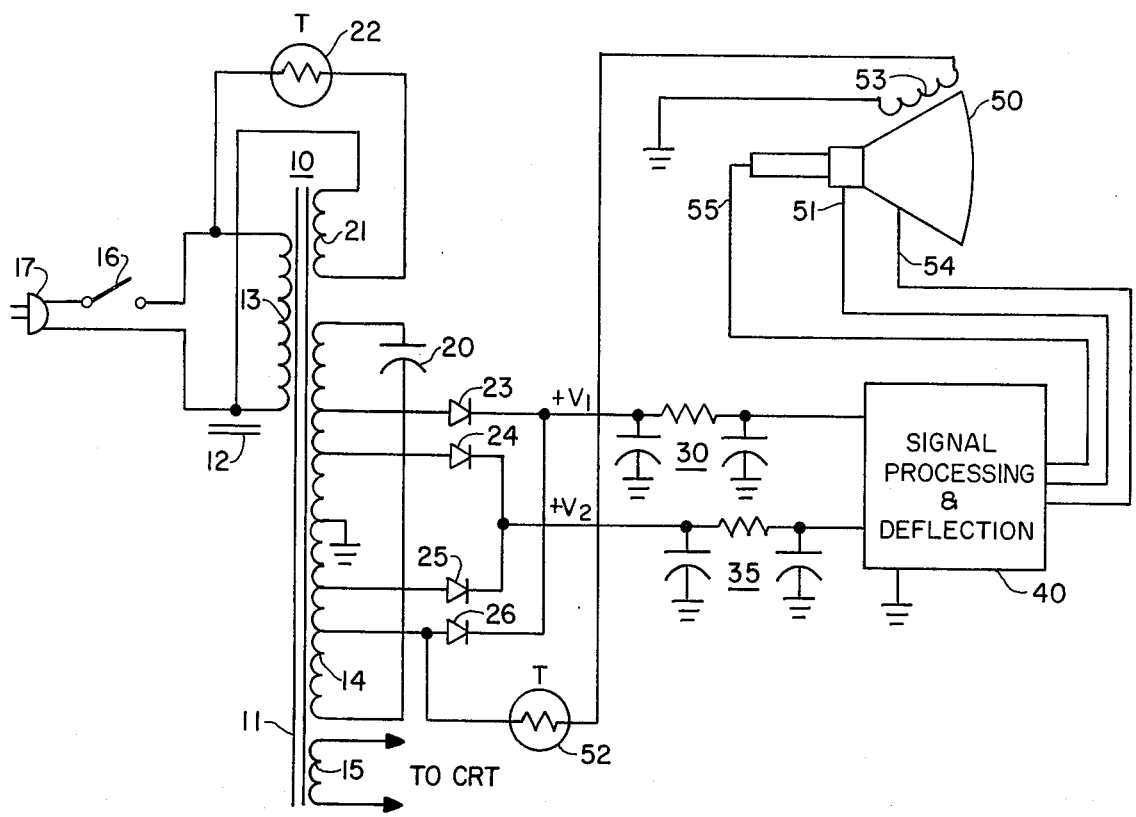
FIG. 1 shows a combined block-schematic diagram of a television receiver incorporating the invention.

Referring to FIG. 1, a constant voltage transformer 10 of conventional design includes a main core 11, a shunting core 12, a primary winding 13, a grounded center tap secondary winding 14 and a CRT filament winding 15. Primary winding 13 is connectable through a single pole switch 16 and a standard electrical plug 17 to a source 120 volt, 60 Hz current available from a conventional household electrical outlet (not shown). A tuning capacitor 20 is coupled across secondary winding 14 and, in a well-known manner, resonates the secondary winding at about 60 Hz which saturates a portion of the transformer core to produce the regulating action. A plurality of taps on the secondary winding supply a corresponding plurality of diodes 23–26 for deriving appropriate positive DC voltages for the receiver. Specifically diodes 23 and 26 are connected to derive a positive voltage +V1 and diodes 24 and 25 connected to derive a lower positive voltage +V2. The cathodes of diodes 23 and 26 are connected to a conventional filter circuit 30 comprising a pi arrangement of a pair of capacitors and a resistor which supply a block 40 labelled Signal Processing & Deflection. Similarly, the cathodes of diodes 24 and 25 supply a conventional filter circuit 35 for providing a lower DC voltage to block 40.

A conventional color television picture tube 50 is shown in outline form and includes a yoke 51 which is supplied deflection currents from the deflection means in block 40. A high voltage lead 54 supplies picture tube 50 with the required high DC potential and a signal lead 55 should be understood to carry the various luminance and chrominance video information to the electron guns in the picture tube. The anode of diode 26 is connected, through a thermistor 52, to a degaussing winding 53 situated closely adjacent picture tube 50. The other end of the degaussing winding is returned to ground to complete an alternating current path to the transformer secondary winding through the grounded center tap. Picture tube 50 includes a magnetically susceptible shadow mask adjacent its viewing screen.

As is well known, when the television receiver is initially turned on, thermistor 52 is cold (at ambient room temperature) and has a low resistance. Initially, a relatively large AC current flows from secondary winding 14, through thermistor 52, to degaussing winding 53 for establishing an alternating magnetic field in the vicinity of the permeable material in the picture tube. Thermistor 52 heats up rapidly and experiences a resistance increase, resulting in a tapering of the alternating current and corresponding diminishing of the degaussing field.

It will be appreciated that the circuit description thus far in general pertains to any conventional VRT type color television receiver with degaussing. The difference is in the addition of a secondary winding 21 which is connected through another thermistor 22 across the terminals of primary winding 13. With this arrangement, transformer 10 operates as a conventional transformer as long as the resistance of thermistor 22 is sufficiently low to permit energization of secondary winding 21. As is true of thermistor 52, when the receiver is turned on from a cold start, the resistance of thermistor 22 is low and secondary winding 21 is supplied with full line potential, enabling much higher current flow in the degaussing circuit by preventing core saturation. The resistance of thermistor 22 increases rapidly (within a few cycles), disabling secondary winding 21 and restoring operation of the transformer to its normal voltage regulating mode. However, the current (most importantly the initial current) supplied to degaussing winding 53 is sufficiently high to degauss the picture tube and associated permeable material without requiring an unduly low resistance degaussing current path. The degaussing circuit is also seen to be isolated from the transformer primary.

Figure 2:
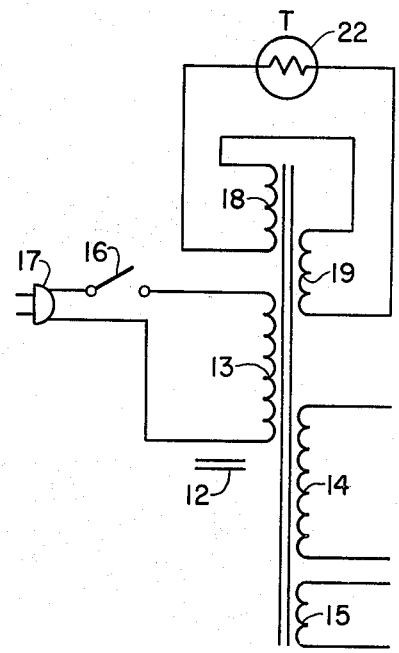
FIG. 2 shows a modification of a portion of the circuit of FIG. 1.

In FIG. 2 a modified embodiment is disclosed in which secondary winding 21 is replaced with an additional primary winding 18 and an additional secondary winding 19. The remainder of the transformer circuit is the same as is the rest of the television receiver circuitry. With this change, however, it is seen that the line voltage present on the primary side of the transformer is completely separate from primary winding 13, which affords an even greater degree of isolation. Thermistor 22 is connected in series between additional primary winding 18 and additional secondary winding 19 and performs in an identical manner. In practice, additional secondary winding 19 (and 21) may be arranged to supply approximately 70% of the initial degaussing current, that is, if a 10 ampere initial degaussing current amplitude is desired, the effective degaussing current due to the additional secondary winding may be on the order of 7 amperes.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A color television receiver comprising: signal processing and deflection circuitry; a picture tube including permeable material subject to being magnetized by extraneous magnetic fields; a voltage regulating transformer having a saturable core and a primary and secondary winding for supplying current at a regulated voltage to said circuitry; degaussing means including a degaussing coil positioned adjacent to said picture tube for periodically developing an alternating magnetic field of diminishing strength for demagnetization of said permeable material; and means temporarily altering the operation of said voltage regulating transformer for enabling greater current flow through said degaussing coil.

2. A color television receiver as in claim 1, wherein said degaussing means are operable each time said receiver is energized from a "cold" start and include a temperatureresponsive impedance.

3. A color television receiver as in claim 2, wherein said last-mentioned means include an additional secondary winding electrically coupled to said primary winding.

4. A color television receiver as in claim 3, wherein a second temperature-responsive impedance is connected in series with said additional secondary winding for automatically disabling said additional secondary winding after a predetermined time interval.

5. A color television receiver as in claim 4, wherein said additional secondary winding is connected to said primary winding through said second temperature-responsive impedance.

6. A color television receiver as in claim 4, wherein said voltage regulating transformer includes an additional primary winding coupled to said additional secondary winding.

* * * * *